Patented Dec. 10, 1935

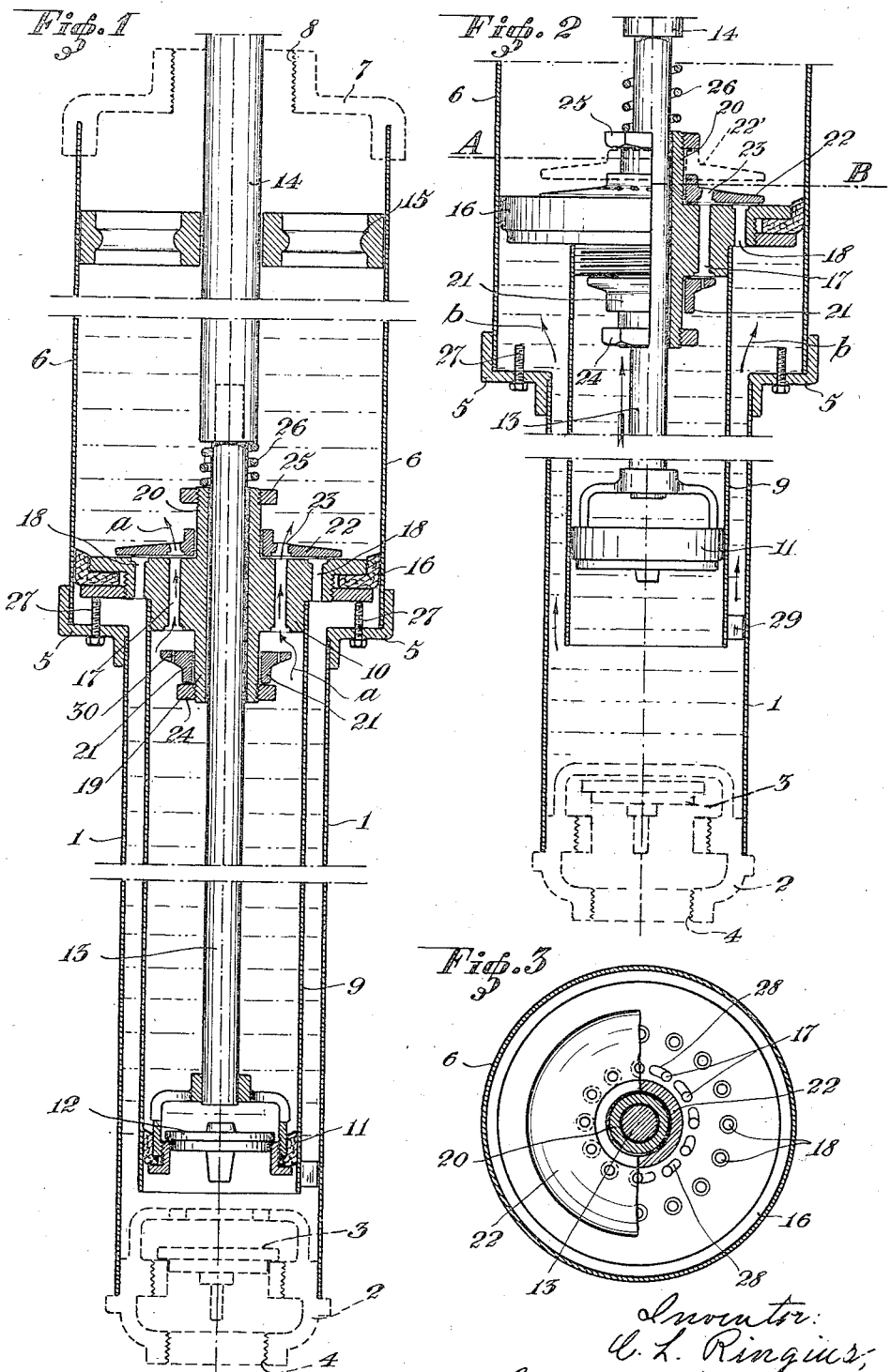

2,023,771

UNITED STATES PATENT OFFICE 2,023,771

CYLINDER PUMP FOR WINDMILLS

Carlos Leonardo Ringius, Buenos Aires, Argentina

Application May 11, 1934, Serial No. 725,211

8 Claims. (Cl. 103—37)

My invention relates to a new pump for wind mills, embodying certain novel features to be described hereinafter.

The art at the present time comprises pumps having cylinders of various diameters, those of larger size of course having larger capacity at each stroke.

While wind mills with cylinder pumps of small diameter, i. e., of small capacity, can operate even when the speed of the wind is reduced, since but little force is required, they have the serious drawback that when the wind is strong, then, although the pump may work rapidly, the full force of the wind cannot be availed of.

On the other hand, in the case of wind mills provided with cylinder pumps of large diameter, while they can employ with advantage the force of a strong wind they have their own peculiar disadvantage in that when the wind has but little velocity or force, that force is not sufficient to operate the pump and it becomes necessary to shut the wind mill down.

The above difficulties, inherent in both sizes of prior art pump cylinders have been solved by my invention, in accordance with which two cylinders of different diameters are combined in tandom, each having its corresponding piston, and both pistons being actuated by the same rod, means being provided by which, when the speed of the wind is relatively low, it is possible to actuate only the small piston; whereas, as soon as the force of the wind is increased beyond a certain limit, the large piston is automatically brought into action, so that greater pump energy is available, thus using the full force throughout its energy range.

In order that the invention may be clearly understood and carried into practice, a preferred form thereof is illustrated in the accompanying drawing, wherein:

Fig. 1 is a longitudinal or vertical section through the cylinder of the pump,

Fig. 2 is a view similar to Fig. 1, the pump being in one of its working positions, and Fig. 3 is a transverse section along the line A—B of Fig. 2.

In this drawing the same reference numbers designate similar or equivalent parts.

In the drawing a guide casing 1 is shown as carrying at its lower end a cover 2 preferably provided with a valve 3 to which may be threaded at 4 a tube communicating with the fluid to be pumped. Cover 2 is shown as connected to tube 1. This latter is shown as fixedly connected at its upper end to part 5, to which is also fixed the lower end of the wall 6 of the large cylinder, which latter is fixedly provided at its top with another cover 7 adapted to be threaded at 8 to a tube through which passes the pumped fluid.

Concentrically within the casing 1 is a cylinder 9 of somewhat smaller diameter, and supported at its upper end by a collar 10 which constitutes the body of the piston of larger size. Within the smaller cylinder 9 there moves a piston 11 (of the usual type) preferably provided with a valve 12 shown as mounted on rod 13. The rod 13 is shown as being threaded at its upper end or otherwise secured to another rod 14, of larger diameter, and which is actuated by the wind mill. This rod 14 preferably runs within a guide or bearing shown as comprising a collar 15 fixed to the wall of cylinder 6.

Collar 10, as has been said, constitutes the body of the large piston and preferably is provided with a leather gasket 16 in order to make a tight joint with the inside of cylinder 6; this collar 10 is shown as carrying two annular rows or sets of perforations 17 and 18, disposed concentrically, for a purpose to be described hereinafter. Collar 10 also preferably carries, at its bottom and top ends, two cylindrical extensions 19 and 20 along which valves 21 and 22, respectively, are externally slidable, the valve 22 being shown as provided with perforations 23, designed to register with the holes 17 of the collar 10. The stroke or movement of these valves 21 and 22 is controlled by suitable means such as the nuts 24 and 25.

*Operation.*—The operation of the above-described device is as follows:

When the wind blows at a relatively slow speed, the wind mill moves because it does not require other power than that demanded to reciprocate the small piston 11 together with its load. Such operation takes place in the usual manner; that is to say, turning of the wind mill causes the small piston to reciprocate for producing a vacuum which raises the valve 3, producing the intake fluid, all this occurring until such time as the piston reaches the top of its stroke. At those times when the piston descends, the valve 3 is closed and the valve 12 opens to let the water pass to the interior of the small cylinder 9. The operation is repeated continuously and the water that remains inside the cylinder 9 is passed to the large cylinder 6, through the perforations 17 and 23 indicated with the arrows *a*.

From the large cylinder 6 the water passes through a tube which may be threadedly connected at 8 to the assemblage.

When the force of the wind increases, the rod 13 moves more rapidly, producing more pressure on the fluid contained in the small cylinder 9, as a result of which pressure the said fluid passes at a higher speed through the perforations 17 and 23, until eventually a critical point is reached at which the fluid has such velocity (force) in passing through the said perforations, that all of the fluid cannot be accommodated therein, and the valve 21 is moved bodily, thereby substantially closing the perforations 17. Under these conditions, while the rod continues ascending, the fluid enclosed within the cylinder 9 pushes against the large piston, which thereby slides upwardly along rod 13, as can be seen in Fig. 2. Intake of the fluid to be pumped into the large cylinder now occurs, so that the amount of work and volume of fluid pumped are both larger for each stroke of the piston.

In Fig. 2 there is shown the relative position of the elements when the wind mill is moving, as was said, at a certain high speed and at a moment when the water is being drawn in. As can be seen, valve 3 is open and piston 11 is displaced a short distance within cylinder 9 before it acts to close valve 21 in order at that time to tightly close the fluid within the said cylinder and to exert pressure on the large piston for causing the latter to draw up the fluid directly along the path following the arrows b. Valve 22 at that time closes the openings 18.

When the rod 13 has reached the top of its stroke and the large piston is about to begin its down stroke, the valve 3 closes and the fluid contained in the cylinder 6 passes through the collar 10 of the piston via the openings 18, this being due to the fact that when the collar 10 descends, the fluid tends to pass forcefully through the openings 18, thereby lifting the valve 22 into position 22' (Fig. 2).

A spring 26 or the like is preferably provided to prevent the rod 14, on the return movement, from striking against the upper part 20 of the large piston, this spring also preferably serving to downwardly bias the said piston. When the large piston is at its lowest level, valve 22 falls by its own weight, closing opening 18, and placing the assemblage in condition for a stroke. The down stroke of the large piston is preferably limited by suitable means such as stops 27, shown as threaded on part 5.

The top part of perforations 17 are shown as provided with small cavities or lateral extensions or fillets 28 (Fig. 3), preferably funnel-shaped, so that should slight rotary movements be imparted by any reason to the valve 22, communication will always exist between the perforations 17 and 23.

Three guides 29 are shown as fixed to the small cylinder 9, and are slidable internally in casing 1, in order to prevent undue displacements of the said cylinder.

The valve 21 may be provided with small channels 30 registering with channels 17 in order to reduce the effect of the hammer blows which occur when the valve 21 is raised in order to close the perforations 17.

It is evident that many modifications may be introduced in the construction and details of the apparatus without departing from the scope of the invention, which is to be limited only by the language of the appended claims.

I claim:

1. Apparatus for efficiently utilizing available varying energy in the pumping of fluids, comprising a fluid intake, two pistons of unequal areas, the larger piston being perforated, a piston rod common to both pistons, communicating cylinders for said pistons, a by-pass structurally directly connecting the intake with the larger cylinder, means whereby the smaller piston draws in fluid to be pumped, through said intake into its cylinder and said by-pass, and thence normally passes the fluid from its cylinder without substantial impedance through said larger piston into the larger cylinder, means actuable by the fluid pressure in the smaller cylinder for substantially closing the passage between the two cylinders when the pressure exerted by the smaller piston exceeds a critical value and for exerting said excess pressure on said larger piston, and part of said first means, upon the said increase in pressure beyond the critical value, forcing the fluid to be pumped, through said inlet via said by-pass directly through said larger piston into its cylinder where it can be operated on by the said larger piston, without the fluid passing through the cylinder of the smaller piston.

2. Apparatus for efficiently utilizing available varying energy in the pumping of fluids, comprising two pistons of unequal areas, a piston rod common to both pistons, cylinders for said pistons and communicating directly with each other, a fluid intake connecting directly with the cylinder for the smaller piston, a by-pass for said smaller cylinder and mechanically directly connecting the intake with the cylinder for the larger piston, the said larger piston having a first set of perforations through which fluid can pass from one cylinder to another, and a second set of perforations through which fluid can pass between the by-pass and the cylinder for the larger piston, the said piston rod and the smaller piston being reciprocable at varying speeds, means whereby the smaller piston draws in fluid to be pumped, through said intake into its cylinder and said by-pass, and thence normally passes the fluid from its cylinder without substantial impedance through the first set of perforations in the larger cylinder, means actuable by the fluid pressure in the smaller cylinder for substantially closing the passage between the two cylinders when the pressure exerted by the smaller piston exceeds a critical value, whereby an approximately rigid fluid column in said smaller cylinder transmits pressure from the smaller piston to the larger piston to actuate the latter, and part of said first means, when the pressure exerted by said smaller piston exceeds said critical value, forcing the fluid to be pumped, through said intake via said by-pass directly through said larger piston into its cylinder where it can be operated on by the said larger piston, without the fluid passing through the cylinder of the smaller piston.

3. Apparatus for efficiently utilizing available varying energy in the pumping of fluids, comprising two pistons of unequal areas, a piston rod common to both pistons, cylinders for said pistons and communicating directly with each other, a fluid intake connecting directly with the cylinder for the smaller piston, a by-pass for said smaller cylinder and mechanically directly connecting the intake with the cylinder for the larger piston, the said larger piston having a first set of perforations through which fluid can pass from one cylinder to another, and a second set of perforations through which fluid can pass between the by-pass and the cylinder for the larger piston, the said piston rod and the smaller piston being reciprocable at varying speeds, means whereby the smaller piston draws in fluid to be pumped, through said intake into its cylinder and said by-pass, and thence normally passes the fluid from its cylinder without substantial impedance through the first set of perforations in the larger cylinder, means actuable by the fluid pressure in the smaller cylinder for substantially closing the passage between the two cylinders when the pressure exerted by the smaller piston exceeds a critical value, whereby an approximately rigid fluid column in said smaller cylinder transmits pressure from the smaller piston to the larger piston to actuate the latter, part of said first means, when the pressure exerted by said smaller piston exceeds said critical value, forcing the fluid to be pumped, through said intake via said by-pass directly through said large piston into its cylinder where it can be operated on by the said larger piston, without the fluid passing through the cylinder of the smaller piston, and means for closing the second set of perforations in the larger piston during the working stroke of the latter, and for uncovering them during the return stroke of said larger piston.

4. Apparatus for efficiently utilizing available varying energy in the pumping of fluids, comprising two pistons of unequal areas, cylinders for said pistons and communicating directly and in abutting relation with each other, a casing disposed concentrically about and in spaced relation with respect to the cylinder for the smaller piston and also communicating directly with the cylinder for the larger piston, a fluid intake in said casing, a piston rod extending through said pistons, on which the smaller piston is fixed and on which the larger piston is slidable, the said larger piston having a first set of perforations through which fluid can pass from one cylinder to another, and a second set of perforations through which fluid can pass between the casing and the cylinder for the larger piston, the said piston rod and the smaller piston being reciprocable at varying speeds, a one-way valve in said intake, means associated with said smaller piston whereby the latter draws in the fluid to be pumped through said intake into its cylinder and thence normally passes the fluid from its cylinder without substantial impedance through the first set of perforations in the large cylinder, means actuable by the fluid pressure in the small cylinder for substantially closing the passage between the two cylinders when the pressure exerted by the smaller piston exceeds a critical value, whereby an approximately rigid fluid column thereby formed in said smaller cylinder transmits pressure directly from the smaller piston to the loosely fitting larger piston, to actuate the latter, the said first means, when the pressure exerted by said smaller piston exceeds said critical value, cooperating with the latter to force the fluid drawn in through said intake directly through said larger piston into its cylinder where it can be operated on by the said larger piston, without the fluid passing through the cylinder of the smaller piston, and means for closing the second set of perforations in the larger piston during the working stroke of the latter, and for uncovering them during the return stroke of said larger piston.

5. Apparatus for efficiently utilizing available varying energy in the pumping of fluids, comprising two pistons of unequal areas, cylinders for said pistons and communicating directly and in abutting relation with each other, a casing disposed concentrically about and in spaced relation with respect to the cylinder for the smaller piston and also communicating directly with the cylinder for the larger piston, a fluid intake in said casing, a piston rod extending through said pistons, on which the smaller piston is fixed and on which the larger piston is slidable, the said larger piston having a first set of perforations through which fluid can pass from one cylinder to another, and a second set of perforations through which fluid can pass between the casing and the cylinder for the larger piston, the said larger piston having cylindrical extensions or hubs at each of its piston faces, surrounding said piston rod, valves fitting one about each of said extensions and slidable therealong and each controlling one of the two sets of perforations in the larger piston, stops for limiting the movement of said valves along said extensions, the said piston rod and the smaller piston being reciprocable at varying speeds, a one-way valve in said intake, means associated with said smaller piston whereby the latter draws in the fluid to be pumped through said intake into its cylinder and thence normally passes the fluid from its cylinder without substantial impedance through the first set of perforations in the large cylinder, one of the said valves on the larger piston being actuable by the fluid pressure in the small cylinder to substantially close the first set of perforations in said larger piston when the pressure exerted by the smaller piston exceeds a critical value, whereby an approximately rigid fluid column thereby formed in said smaller cylinder transmits pressure directly from the smaller piston to the loosely fitting larger piston, to actuate the latter, the said first means, when the pressure exerted by said smaller piston exceeds said critical value, cooperating with the latter to force the fluid drawn in through said intake directly through the second set of perforations in said larger piston into its cylinder where it can be operated upon by the said larger piston, without the fluid passing through the cylinder of the smaller piston, the valve for the second set of perforations closing the latter during the working stroke of the larger piston, and uncovering them during the return stroke thereof.

6. Apparatus according to claim 4, wherein the valve for the first set of perforations has perforations of small bore registering with those of the larger piston, in order to prevent water hammer when said valve is seated on said piston.

7. Apparatus according to claim 5, wherein the stops are provided on the ends of the extensions or hubs.

8. Apparatus according to claim 5, wherein the stops are adjustable.

CARLOS LEONARDO RINGIUS.